Jan. 6, 1959   P. H. SCHERF ET AL   2,867,134
ADJUSTABLE STROKE CRANK

Filed April 23, 1957   2 Sheets-Sheet 1

FRED R. BAYNE
RODERICK F. HAMMACK
PAUL H. SCHERF
INVENTORS.

BY
CORBETT, MAHONEY & MILLER, ATTYS.

Jan. 6, 1959    P. H. SCHERF ET AL    2,867,134
ADJUSTABLE STROKE CRANK

Filed April 23, 1957    2 Sheets-Sheet 2

*INVENTORS*
FRED R. BAYNE
RODERICK F. HAMMACK
PAUL H. SCHERF
BY CORBETT, MAHONEY, MILLER
& RAMBO, ATTY'S.
BY *Wm. V. Miller*

United States Patent Office 2,867,134
Patented Jan. 6, 1959

2,867,134

ADJUSTABLE STROKE CRANK

Paul H. Scherf, Fred R. Bayne, and Roderick F. Hammack, Lancaster, Ohio, assignors to Alten Foundry & Machine Works, Inc., Lancaster, Ohio, a corporation of Ohio Application April 23, 1957, Serial No. 654,513

4 Claims. (Cl. 74—600)

Our invention relates to an adjustable stroke crank. It has to do, more particularly, with a crank for an oil field pumping unit having means for readily changing the stroke length of the crank.

In the conventional beam type oil field pumping unit, counterbalance weights are used to help lift the well load and to smooth out the loads applied to the gear reducer and the prime mover, which drives the gear reducer. In most installations and especially in the larger type pumping units, these counterbalance weights are applied to the crank. On the crank balanced type unit, it can easily be seen that for any one length crank, the wider the crank and the counterbalance weights, the more counterbalance effect is obtained. For this reason, the general practice is to make the cranks just as wide as possible and still leave the necessary clearance between the pitman shaft on one side and the reducer sheave on the other side which are generally the two points of closest interference. In order to have both the wide crank and the necessary clearance, the wrist pin nut, which locks the wrist pin to the crank, usually is recessed in a pocket in the back side of the crank casting so that it does not extend outside the edge of the crank casting. The usual crank has a series of tapered wrist pin holes machined on a center line running lengthwise along the crank. Depending upon which stroke is required, the wrist pin is locked into a selected one of these holes.

For many various reasons, the stroke length of the crank on oil field pumping units has to be changed. With present counterbalanced crank structures, the changing of the stroke length is now a long complicated and dangerous job. Since the wrist pin has to be removed from one hole and repositioned and locked into another, the well load has to be removed from the pumping unit by tying it off so as to remove the load from the wrist pin. Because the wrist pin nut is in the recess at the rear of the crank, it is very awkward to get to the nut and even then, special offset wrenches are usually required to reach the nut. Usually through a combination of rust and tight assembly, it is necessary to sledge the wrench handle, in order to loosen the nut. This is, of course, always dangerous, since the wrench may slip from the nut or the sledge may miss the wrench altogether. Furthermore, before reassembling the wrist pin in another hole, the hole has to be cleaned to assure a good mating fit with the wrist pin. If any dirt, paint, grease, etc. is left in the hole, there is a good possibility that the fit between the hole and the pin will become loose and the pin will rotate in the crank, eventually causing failure. After the hole is cleaned, and the pin is reassembled in the hole, it is again the general practice to sledge the nut tight on the pin in an attempt to assure that the pin will remain tight in the crank. After all the above procedures, the well load may again be applied to the pumping unit and the unit set in operation.

It is the main object of our invention to provide a crank structure in which the stroke length can be adjusted easily and quickly without removal of parts or the breaking or freeing of any connections.

Another object of our invention is to provide an adjustable stroke crank structure which is of such a nature that the well load need not be removed from the pumping unit during adjustment of the stroke.

Other objects will be apparent from the following description and the drawings.

According to our invention we provide a crank with stroke adjusting mechanism which includes a slide which carries the wrist pin and which is mounted for adjustment longitudinally of the crank on a guideway provided on the crank. The adjustment is made by the operation of a screw which does not project in any direction from the crank so that it will be in a position of non-interference with any other parts of the pumping unit. The mechanism is so constructed that the stroke of the crank can be adjusted at any time merely by rotating the adjusting screw since parts will not be clamped together and there will be no danger of freezing by reason of corrosion, dirt or paint between the parts. However, the construction is such that the wrist pin will be snugly connected to the crank without danger of relative movement or vibration which would tend to cause failure of the pumping unit.

In the accompanying drawings, we have illustrated an adjustable stroke counterbalanced crank structure for oil well pumping equipment in which our invention is embodied.

Figure 5:
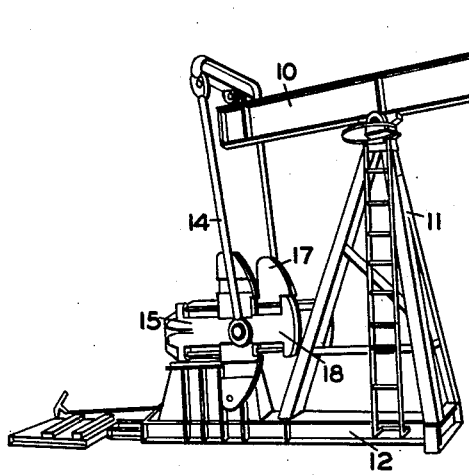
Figure 5 is a perspective view illustrating our adjustable stroke counterbalanced crank structure applied to an oil well pumping unit.
Figure 3:
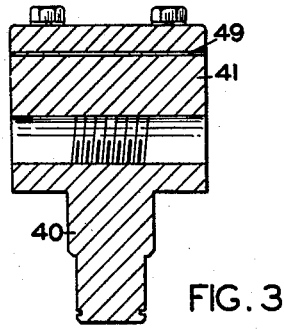
Figure 3 is a reduced horizontal sectional view taken along line 3—3 of Figure 2 through the wrist pin slide block of the stroke adjusting means.

With reference to the drawings, in Figure 5 we have illustrated our adjustable stroke crank applied to an oil field pumping unit of the crank counterbalanced type. This unit in its general construction is of a common type and includes the walking beam 10 supported for oscillation in a vertical plane on the samson-post 11, which is carried by the frame 12. One end of the walking beam 10 carries the horse head 13 to which the load of the polished rod and the sucker rod is connected in the usual manner. The other end of the walking beam 10 is pivotally connected to the upper end of the double pitman rod structure 14 which is connected at its lower end to the double counterbalanced crank structure 15, associated with the usual gear reducer unit 16. Each crank includes the counterbalance weights 17 which are adjustable longitudinally thereof by means of the screws 18 in the usual manner.

In each crank of the double counterbalanced crank structure 15, our invention is embodied as shown. The structure of each crank is illustrated in Figures 1 to 4, inclusive.

Each crank comprises the crank body 20 of elongated form which is provided with the split clamp structure 21 at one end by means of which the crank can be clamped to the shaft of the gear reducer unit 16. On each straight edge of the body 20 a guide 22 of dovetail cross-section is provided for receiving the counterbalance weights 17 in the usual way which are adjustable along the crank body by means of the screws 18. Outwardly projecting lug structures 23 and 24 are provided at opposite ends of the crank body 20 and are provided with openings 25 and 26, respectively, for mounting the counterbalance weight adjusting screws 18.

Figure 1:
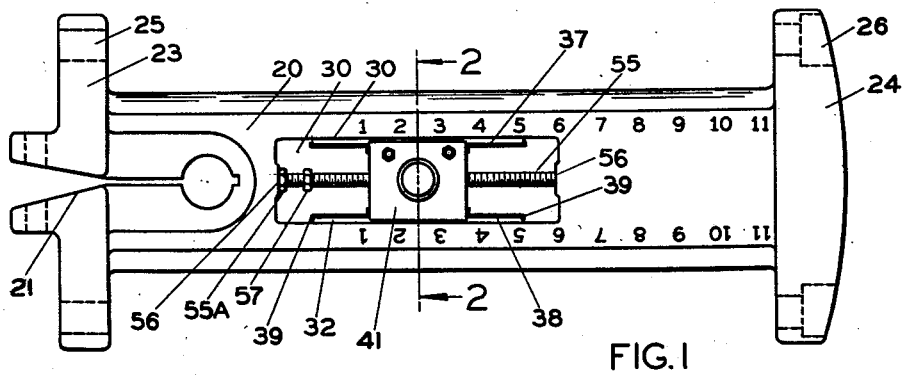
Figure 1 is a face view of a crank with the stroke adjusting mechanism associated therewith in accordance with our invention.
Figure 2:
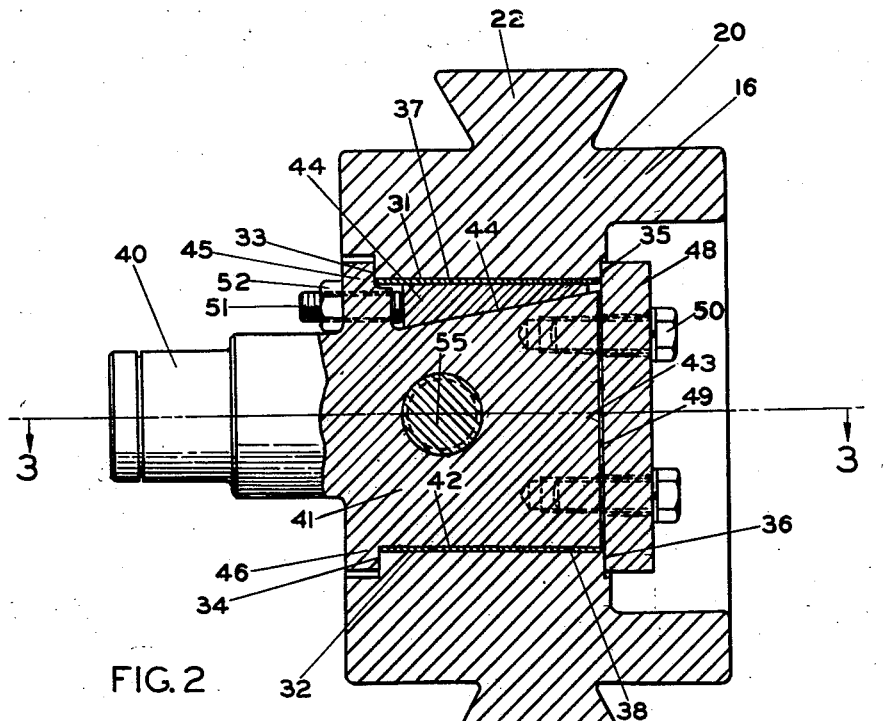
Figure 2 is an enlarged transverse sectional view taken along line 2—2 of Figure 1 through the crank and adjusting mechanism.

Formed within the body 20 of the crank and extending longitudinally thereof in spaced parallel relationship to the ribs 22 is an elongated guideway opening 30, as shown best in Figure 1. This opening 30 has the upper guideway bearing 31 and the lower guideway bearing 32 formed thereon which preferably have machined flat surfaces so that they are exactly parallel with each other. At the wrist pin side of the crank body 20, as shown in Figure 2, there is provided at the edge of the bearing 31 an upper retaining shoulder 33 and a similar lower shoulder 34 is provided at the corresponding edge of the bearing 32. At the opposite side of the body 20 there is provided an upper retaining shoulder 35 at the edge of the bearing 31 and a lower shoulder 36 at the corresponding edge of the bearing 32. It will be noted that the bearings 31 and 32 extend almost the full length of the opening 30 but terminate somewhat short of the ends of the opening. The bearings 31 and 32 may be covered with thin bearing strips 37 and 38, respectively, which are of non-corrosive material such as bronze. These strips are secured to the bearings 31 and 32 to prevent relative longitudinal movement, for example, by inturned lips 39 at each end which extend over the ends of the bearings 31 or 32.

The wrist pin 40 is of the usual form but is formed integral with a slide block 41. This slide block 41 is mounted within the crank opening 30 and between the guideway bearings 31 and 32 so that the wrist pin 40 will project laterally from the body of the block as shown best in Figure 2. The block 41 has a lower flat bearing surface 42 which will rest on the lower bearing strip 38. The face of the block 41 opposite to the side which carries the wrist pin is a flat surface 43. The upper surface of the block is a transversely inclined surface 44 which extends from the face 43 to an upstanding retaining lug 45 at the wrist pin side of the block. This lug 45 extends over the shoulder 33 on the bearing 31. At the same side, the block 41 is provided with a depending retaining lug 46 which extends down over the shoulder 34 of the bearing 32.

Figure 4:
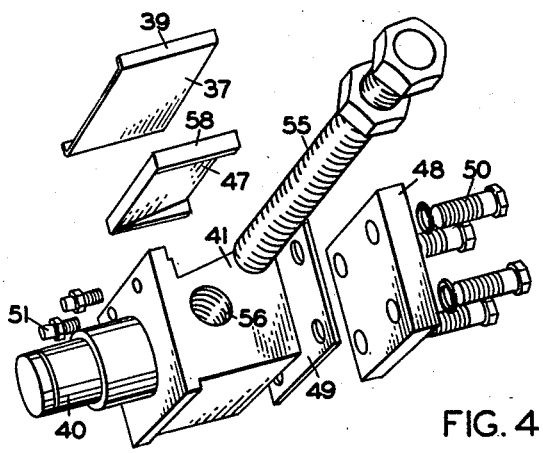
Figure 4 is an exploded view in perspective illustrating the wrist pin mounting slide block and the parts which are to be associated therewith.

On the inclined surface 44 of the block 41 there is provided a wedge 47 which has a flat upper surface that engages the upper bearing strip 37 and a transversely beveled lower surface which is complemental to the inclined surface 44 of the block 41. This wedge member 47, as shown in Figure 4, has the depending lips 48 at each end which overlap the ends of the block 41 to prevent relative longitudinal movement between these members but to permit relative transverse movement.

The face 43 of the block 41 carries the retaining plate 48 which has a flat inner surface that is disposed in contact with a shim 49 provided between it and the face 43 of the block 41. This plate 48 is clamped against the shim 49 by means of four clamping bolts 50 which extend through openings adjacent the corners of the plate and shim and are threaded into the block 41. It will be noted in Figure 2 that when the plate 48 is mounted on the face of the block 41 its upper edge overlaps the shoulder 35 on the bearing 31 and its lower edge overlaps the shoulder 36 on the bearing 32.

To adjust the wedge member 47 transversely of the block 41 a pair of adjusting screws 51 are provided which are threaded through the upstanding lug 45 on the block 42 and which engage the adjacent thicker edge of the wedge 47. A lock nut 52 is provided on each screw 51 for locking it in adjusted position.

So that the slide block 41 will fit snugly within the guideway bearings 31 and 32 for movement therealong without transverse movement realtive thereto, the various parts are related and adjusted as follows:

The wedge member 47 is adjusted transversely of the block 41 by means of the screws 51. It is adjusted to such an extent that the lower flat surface 42 of the block will contact firmly without binding with the lower bearing strip 38 and the upper flat surface of the wedge 47 will contact firmly without binding with the upper bearing strip 37. Therefore, relative sliding will be permitted between these cooperating surfaces. The retaining plate 48 will be clamped to the flat face 43 of the block 41 but the shim 49 will be of such thickness that the upstanding retaining lug 45 will engage the shoulder 33 firmly without binding, the depending lug 46 will engage the shoulder 34 firmly without binding, and the upper and lower edges of the retaining plate 48 will engage the respective shoulders 35 and 36 firmly without binding. Therefore, the block 41 is mounted for free sliding movement in the crank opening 30 but without possibility of vertical or lateral movement. Thus, a snug fit is provided for the block 41 within the crank opening 30 without danger of relative lateral or vertical movement between these members while still permitting the desired longitudinal relative sliding movement to provide for adjustment of the stroke.

To make the adjustment of the block 41 longitudinally of the crank opening 30 so as to move the wrist pin 40 longitudinally along the crank body 20, a simple screw arrangement is provided. This arrangement includes the threaded screw 55 which is threaded through an opening 56 extending longitudinally through the wrist pin block 41. The screw 55 is slightly shorter than the opening 30 but to hold it tight between the flat bosses 56 at the end of the opening, a nut 55a is threaded on one end. The screw 55 may be rotated by means of a jam-nut 57 which is mounted adjacent one end of the screw and may be welded thereon to prevent relative rotation. It will be apparent that when the screw 55 is rotated with a wrench applied to the nut 57, the wrist pin block 41 will be moved longitudinally of the opening 30 and, therefore, longitudinally of the crank body 20 to adjust the stroke. The nut 55a is moved inwardly on the screw 55 during this adjustment but after the adjustment is made is moved outwardly until it firmly contacts the adjacent boss 56 to obtain a tight fit of the screw 55 in the opening 30. This stroke adjustment can be made at any time since although the block fits snugly within the guide bearings 31 and 32 and is prevented from moving laterally thereof, there is no binding between these contacting parts and the block can always be adjusted longitudinally relative to the bearing surfaces.

Figure 6:
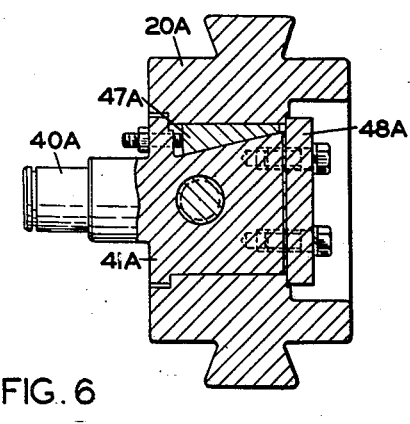
Figure 6 illustrates a slight modification of the stroke adjusting mechanism.

In Figure 6, we have illustrated a slight modification of our crank structure. This structure is exactly the same as that previously described including the crank body 20a, the wrist pin block 41a that carries the wrist pin 40a, the wedge member 47a, and the retaining plate 48a. However, in this instance, the bearing strips 37 and 38 are eliminated as they are not necessary for all installations.

It will be apparent from the above description that we have provided a crank structure in which the stroke length can be adjusted easily and quickly at any time without removal of parts or the breaking or freeing of clamping connections. The adjustment may be made at any time without removal of the load from the pumping unit. Although the longitudinal adjustment of the block on the crank can be made easily because there are no binding parts, the wrist pin will be firmly connected to the crank without danger of any relative movement or vibration during operation of the pumping unit which might produce failure of the pumping unit.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described our invention, what we claim is:

1. An adjustable stroke crank for an oil well pumping unit comprising a one-piece crank body having an elongated guide opening extending longitudinally therewithin with bearings formed along the elongated edges thereof, a mounting block slidably mounted in said opening and carrying a wrist pin projecting laterally outwardly from said opening, said block having retaining shoulders which engage the faces of the bearings adjacent the elongated edges of the guide opening to prevent lateral movement in both directions of the block from the guide opening, said retaining shoulders comprising oppositely extending lugs integrally formed on the block at one face thereof and extending laterally over the adjacent faces of the respective bearings and a separate retaining plate clamped to the opposite face of the block and projecting laterally over the adjacent faces of the respective bearings, said block having a flat longitudinally extending bearing surface at one edge cooperating with a flat longitudinally extending bearing surface on the bearing at the adjacent edge of said elongated guide opening and having a longitudinally extending transversely inclined surface at its opposite edge, a wedge member disposed at said last-named edge having a flat longitudinally extending outer bearing surface which cooperates with a flat bearing surface on the bearing at the adjacent edge of said elongated guide opening and having a longitudinally extending transversely beveled inner surface complemental to and engaging the inclined edge surface of the block, means for adjusting said wedge transversely of the block and for holding it in adjusted position so that the block will fit snugly into the opening and will be properly guided therealong, and adjusting means for moving said block along the guide opening and holding it in adjusted position, said means comprising a screw threaded through the block extending longitudinally of the guide opening and in engagement with the ends of the guide opening.

2. An adjustable stroke crank according to claim 1 in which said wedge adjusting means comprises adjusting screws engaging the wider edge of said wedge and rotatably anchored to said block.

3. An adjustable stroke crank according to claim 1 in which means is provided for preventing the retaining shoulders at the opposite sides of the block from binding with the adjacent faces of the bearings, said means including a shim between the side of the block and said retaining plate.

4. An adjustable stroke crank according to claim 1 in which the wedge has depending lips at each end which extend over the adjacent ends of said block to prevent relative longitudinal movement between the wedge and the block but which permit transverse movement of the wedge relative to the block.

References Cited in the file of this patent

UNITED STATES PATENTS

| 8,436 | Seward | Mar. 17, 1840 |
| 1,652,617 | Eurit | Dec. 13, 1927 |
| 1,976,241 | Matherne | Oct. 9, 1934 |
| 1,979,675 | Croom | Nov. 16, 1934 |
| 2,106,945 | Francis | Feb. 1, 1938 |